United States Patent Office 3,591,569
Patented July 6, 1971

3,591,569
FREE-FLOWING SINTERED GRANULES OF THERMOPLASTIC ORGANIC POLYMERS
Jerry D. Ilavsky, Sarnia, Ontario, Canada, assignor to The Dow Chemical Company, Midland, Mich.
No Drawing. Filed June 2, 1969, Ser. No. 829,804
Int. Cl. C08d 3/04, 5/02; C08f 15/04
U.S. Cl. 260—88.2
10 Claims

ABSTRACT OF THE DISCLOSURE

Free-flowing sintered granules of normally solid, water-insoluble, thermoplastic organic polymers such as the ethylene polymers are prepared by (1) dispersing a fine powder of the polymer in a non-solvent liquid medium, (2) heating the resulting dispersion to a temperature from about 1° C. below the Vicat softening point of the polymer to about 8° C. thereabove while subjecting the dispersion to agitation and (3) cooling the dispersion under continued agitation.

BACKGROUND OF THE INVENTION

This invention relates to the preparation of free-flowing sintered granules of thermoplastic polymers by agglomeration of small particles of the polymer that are characteristically poor flowing.

Dry, free-flowing powders of thermoplastic polymers, particularly the olefin polymers, are used extensively in the production of thin sheets, films, coatings and especially rotationally molded articles.

Powders currently used for such purposes are often prepared by melting low density polymer particles to fuse the polymer into a single mass that is substantially free of dissolved gas and then grinding the mass into a fine powder. This process is expensive and usually produces rough, irregular particles which are not free-flowing. In addition, the resulting powders have low bulk densities and are not ideally suited for the above purposes.

A method recently proposed for preparing high bulk density powders of poly-α-olefins is described in U.S. Pat. 3,189,588. According to this method the bulk density of a solid poly-α-olefin is increased by slurrying in water a low bulk density polymer powder containing residual inert organic liquid solvent, heating the slurry to 5 to 15° C. below the Vicat softening point of the polymer and removing the solvent rapidly by azeotroping with water. Other methods for preparing free-flowing powders of organic polymer require that the polymer be dissolved in an inert, organic solvent and then precipitated by the removal of the solvent. In many instances the presence of solvents during the preparation of free-flowing powders is undesirable, primarily because their removal is difficult and time consuming. In addition the particles produced by such methods are often irregular in shape.

In view of the problems arising in the preparation of free-flowing particles of thermoplastic polymers by conventional methods, it would be highly desirable to provide an inexpensive method which does not require the use of solvents or the like to prepare free-flowing plastic particles.

SUMMARY OF THE INVENTION

In accordance with the present invention, free-flowing sintered granules of normally solid, thermoplastic organic polymers are prepared by a process comprising the steps of (1) dispersing a fine powder of a normally solid, water-insoluble, thermoplastic organic polymer in a liquid medium which is a non-solvent for the polymer; (2) heating the resulting dispersion to a temperature ranging from about 1° C. below the Vicat softening point of the polymer to about 8° C. above the Vicat softening point while subjecting the dispersion to agitation; and (3) cooling the suspension under continued agitation to produce free-flowing sintered granules greater in size, usually from about 2 to about 100 times greater, than the powder particles from which they were made. In addition, such beads usually have bulk density ranging from about one half to three times that of the starting powder.

The surprising aspect of this invention is the fact that the particles can be partially agglomerated to form the sintered granules, yet be prevented from fusing into a single solid mass. The starting powdery particles, when placed in the liquid medium, agglomerate to a certain extent to form clusters of particles. However, the shearing forces brought about by agitation and the ability of the medium to wet the clusters of particles prevent the clusters from agglomerating further to form very large masses. As these clusters of particles are heated to or just above the Vicat softening point of the polymer, the exterior particles of each cluster coalesce, thus encapsulating the interior particles with a thin shell. If the clusters are sufficiently large, the resulting sintered granules are round in shape and the interior particles are generally unfused. If the clusters are appreciably smaller, the particles composing the resulting granules are fused particles which are stuck together. In either instance the granules are free-flowing.

Granules produced in the practice of this invention are useful in static or fluidized dip coating, spraying, dusting and flame spraying applications. They can also be used in the preparation of molded or formed shapes particularly by means of a rotational molding process. In addition, such beads eliminate the need for expensive specialized extruders needed to accept the powders produced in some polymerization processes.

DESCRIPTION OF THE PREFERRED EMBODIMENTS

The process of this invention requires as starting materials finely divided particles of a normally solid, water-insoluble thermoplastic organic polymer and a non-solvent liquid dispersing medium.

Free-flowing sintered granules of normally solid, water-insoluble thermoplastic organic polymers may be prepared by this invention. Examples include the polymers of α-olefins such as ethylene, propylene, 1-butene, 1-hexene and the like; polymers of monovinylidene aromatic compounds such as styrene, ar-methylstyrene, α-methylstyrene, t-butylstyrene and the like; polymers of the alkyl acrylates and derivatives thereof such as ethyl acrylate, methyl methacrylate, n-butyl acrylate, acrylonitrile and the like; polymers of other ethylenically unsaturated monomers such as vinyl acetate and copolymers of above-listed monomers such as ethylene and butene-1, ethylene and ethyl acrylate, styrene and butyl acrylate, ethyl acrylate and methyl methacrylate, α-methyl styrene and 2-ethylhexyl acrylate and the like. Methods for the preparation of these polymers and copolymers are described fully in Schildknecht, Polymer Processes, vol. X (1956).

Suitable liquid dispersing media are aqueous and non-aqueous liquids which are non-solvents for the particular polymer employed.

Aqueous media suited for the purposes of this invention include water and aqueous solutions of various surfactants and the like. When an aqueous medium is employed, it is generally desirable to carry out the process under pressure sufficient to maintain the medium in the liquid state at the Vicat softening point of the polymer.

It is understood that the presence of surfactant in the aqueous medium is optional. However, the use of surfactant is often desirable as a means of controlling particle size. When used, the surfactant is usually present in small amounts ranging from about 0.001 to about 1.0 weight percent based on the polymer. Preferred amounts of surfactant vary with the particle size desired, the particular surfactant used and the polymer type. Generally an increase in the amount of surfactant results in the formation of smaller beads. Surfactants which may be used are the known water-soluble surface active agents particularly the anionic-type, for example, the sulfated and sulfonated compounds, soaps of monocarboxylic acids, polyacids, and the like. Specifically, the sulfated and sulfonated compounds include sodium dodecyl benzene sulfonate, sodium oleyl sulfate, ammonium dodecyl sulfonate, potassium lauryl sulfate, the alkali metal salts of sulfonated polystyrene, sulfonated polyvinyltoluene and the like. Specific examples of soaps of monocarboxylic acids include sodium laurate, calcium stearate, potassium palmitate and the like. Examples of polyacids include polyacrylic acid and polymethacrylic acid. Non-ionic surfactants which may be utilized include the polyoxyethylene ethers of the higher fatty alcohols, the alkyl phenols and others set forth in Becher, Emulsions:Theory and Practice, 2nd ed., Reinhold Publishing Corporation, New York, 221–225 (1965). Ampholytic surfactants such as disodium-N-tallow-$\beta$-iminodipropionate and cationic surfactants such as octadecylammonium chloride and others described in Becher, supra, on page 221 are also suitable.

Non-aqueous, nonsolvent liquid dispersing media that may be employed in practicing the invention include glycols such as ethylene glycol or polyglycols such as diethylene glycol or triethylene glycol or mixtures thereof with each other or with water. Other polar non-solvent liquids, such as lower aliphatic alcohols and the like, can be used in place of, or together with, water or glycol if desired. Also suitable are amines such as diethanol amine.

The process of this invention is carried out by (1) dispersing the starting fine powder particles of the polymer in the non-solvent liquid suspending medium, (2) heating the dispersion to a temperature ranging from about 1° C. below the Vicat softening point of the polymer to about 8° C. thereabove while agitating the medium and (3) cooling the dispersion under continued agitation.

The polymer powder is dispersed in the liquid medium by adding a suitable proportion of powder to the medium and mixing the components with any conventional mixing device. Such devices are well known to those skilled in the art. Illustratively, a baffled tank equipped with a stirring means is suitable.

For the purposes of this invention, the ratio of liquid dispersing medium to polymer powder is such that a stirrable slurry results. Good results, i.e., particles having a more uniform size and rounded shape, are obtained with medium-to-powder ratios ranging from about 1:2 to about 30:1 by weight, with the best results obtained in dispersions having medium-to-powder ratios from about 5:1 to about 10:1.

The dispersion is heated to a temperature ranging from about 1° C. below the Vicat softening point of the polymer to about 8° C. above the Vicat softening point, preferably from about ½° C. below to about 3° C. above said point. In the case of polymers having melt flow viscosities as determined by ASTM D–1238-65T(E) greater than 5, it is especially preferred to heat the dispersion to a temperature ranging from about 1° C. below the Vicat softening point of the particular polymer to about 3° C. thereabove. By Vica softening point is meant the lowest temperature at which a flattened needle of 1-mm.$^2$ circular cross section will penetrate the thermoplastic polymer to a depth of 1 mm. under a specified load using a selected uniform rate of temperature rise. A more complete description of the test method and condition is given by ASTM D–1525-65T. It should be noted that if the temperature is below the specified range, no appreciable change in particle size or shape is observed; and the particles generally retain their poor flowing character. If temperatures in excess of the specified range are employed, the polymer particles fuse into large masses which can not be redispersed even when using very high agitation rates. It is generally desirable to conduct the heating step in a closed vessel and at pressures sufficient to maintain the liquid dispersing medium in the liquid state. Pressures from about 20 to about 200 pounds per square inch (p.s.i.) are generally sufficient to accomplish this end.

Throughout the heating step, the dispersion is agitated at a rate such that the heat softened polymer particles remain in clusters and thereby are not permitted to agglomerate into a single mass. The desired rate of agitation for a particular system can be readily determined by the skilled artisan. As an illustration and not for the purposes of limitation, the rates of agitation suitable for small reaction vessels having a total volume from about 5 to 10 liters range from about 200 to about 1400 r.p.m. Agitation is beneficially effected with a single loop stirrer or the like, preferably a pitched stirrer which drives any floating polymer particles down into the liquid medium. As a general rule, the particular rate of agitation affects the particle size of the resulting granules to some extent, but usually has less influence than a surfactant or the like which may be employed.

It is necessary to maintain the dispersion at the specified temperatures for a period sufficient to permit the formation of clusters of the starting particles and a film of softened polymer on the surface of the clusters. As a general rules the time required for heating a vessel containing the dispersion to the specified temperature and subsequently cooling it is sufficient. Advantageously, a heating period at the specified temperature of about 1 minute or somewhat less to about 30 minutes is employed. However, a much longer heating time, e.g., 4 to 8 hours, may be employed without causing the polymer to fuse into a solid mass. Increased heating periods do, however, tend to increase particle size and bulk density.

After the particles have agglomerated to form clusters of the desired size and the exterior surfaces of the clusters have become heat softened, the dispersion is cooled while continuing agitation, preferably the same rate of agitation used in the heating step. The method and rate of cooling are not critical in the practice of this invention so long as agitation is maintained until the heat softened surfaces of the clusters harden.

In most embodiments the resulting granules are sintered spheroids having a fused shell surrounding a powdery core. Such granules generally have diameters substantially greater than those of the starting particles, in some instances up to about 5 mm. Such granules are generally characterized by their free-flowing nature.

The following examples are given to illustrate the invention and are not intended to limit the scope thereof. All parts and percentages in the specification and claims are weight percentages unless otherwise indicated.

EXAMPLE 1

A 150-g. portion of linear polyethylene (melt index=12.4, density=0.956 and Vicat softening point=122.5° C.) in the form of powder having bulk density of 16 pounds per cubic foot, and an average particle diameter less than 0.125 mm. is charged to a 6-liter agitated baffled steel reactor, 7 inches in diameter and 10 inches deep with four ½ inch baffles on the walls thereof. The reactor is equipped with a pitched blade stirrer and contains 3.5 liters of water. The resulting slurry is agitated vigorously at 1200 r.p.m. and heated to 123° C. in the closed vessel. The slurry is cooled immediately and the resulting granules are filtered, washed with distilled water and dried. The properties of the resulting free-flowing sintered granules having a fused shell surrounding a powdery core are recorded in Table I. For the purposes of comparison the properties of the starting poor flowing powder ($C_1$) are also recorded in Table I.

EXAMPLES 2–10

Several samples of granules are prepared essentially according to the procedure of Example 1 except that different ethylene polymers, amounts of starting powder and heating periods are employed. In the case of some samples, surfactants are employed. In all cases the ethylene polymers have a Vicat softening point of about 122.5° C. The altered conditions, starting materials, and size and bulk density of the resulting free-flowing granules are shown in Table I.

For the purposes of comparison the bulk density and particle size of the starting poor flowing powders are also shown in table and are labeled $C_x$.

TABLE I

| Example No. | Polymer [1] | Density, g./cc. | Melt index, decig./min.[2] | Water, g. | Starting Powder, g. | Surfactant Type | Surfactant Amount, g. | Max. temp., °C. | Heating period, min.[3] | Bulk density, lb./ft.[3] | Particle size, mm.[4] |
|---|---|---|---|---|---|---|---|---|---|---|---|
| $C_1$* | P/E | 0.956 | 12.4 | | | | | | | 16 | 95% <0.125. |
| 1 | P/E | 0.956 | 12.4 | 3,500 | 150 | None | | 123 | <1 | 24 | 95% in 1–4. |
| 2 | P/E | 0.956 | 12.4 | 3,500 | 300 | do | | 123 | <1 | 25 | 95% in 1–4. |
| 3 | P/E | 0.956 | 12.4 | 3,500 | 300 | Sodium lauryl sulfate. | 1.75 | 123 | <1 | 15.5 | 91% in 0.15–0.42. |
| 4 | P/E | 0.956 | 12.4 | 3,500 | 300 | do | 1.75 | 123 | 30 | 21 | 97% in 0.50–1.41. |
| $C_2$* | E/B | 0.954 | 7.5 | | | | | | | 16 | 95% <0.125. |
| 5 | E/B | 0.954 | 7.5 | 3,000 | 300 | None | | 123 | <1 | 25 | 95% in 1.0–4.0. |
| $C_3$* | E/B | 0.953 | 5.0 | | | | | | | 16 | 95% <0.125. |
| 6 | E/B | 0.953 | 5.0 | 3,500 | 300 | Sodium lauryl sulfate. | 0.215 | 123 | <1 | 17.4 | 95% in 0.15–1.41. |
| 7 | E/B | 0.953 | 5.0 | 3,500 | 600 | do | 0.215 | 123 | <1 | 23.6 | 95% in 0.25–1.41. |
| $C_4$* | E/B | 0.954 | 6.1 | | | | | | | 16 | 95% <0.125. |
| 8 | E/B | 0.954 | 6.1 | 3,000 | 500 | Sodium lauryl sulfate. | 0.180 | 124 | <1 | 17.5 | 89% in 0.15–2.00. |
| 9 | E/B | 0.954 | 6.1 | 3,000 | 500 | do | 0.220 | 124 | <1 | 17.0 | 92% in 0.15–1.41. |
| 10 | E/B | 0.954 | 6.1 | 3,000 | 500 | do | 0.260 | 124 | <1 | 17.0 | 99% in 0.15–1.41. |

[1] P/E=polyethylene and E/B=ethylene/butene-1 copolymer.
[2] As determined by ASTM D-1238-65T(E).
[3] Heating period is given as time reactor is held at maximum temperature. <1 means the reactor is cooled as soon as the maximum temperature is reached.
[4] Particle size is given as the percentage of particles or granules having diameters within the specified range.
*Not an example of the invention.

When the procedure of Example 1 is followed except that the maximum temperature of the reactor reaches a temperature greater than 132° C., the polymer powder fuses into one solid mass. When the procedure of Example 1 is carried out at temperatures of 121° C. or less, no change in the physical properties of the starting particles is observed.

EXAMPLE 11

In a manner similar to the procedure of Example 1, a 100-g. portion of polypropylene powder having a Vicat softening point of about 160° C. is heated in 3.5 liters of water containing 0.015 g. of disodium-N-tallow-β-iminodipropionate to a temperature of 160° C. The dispersion is cooled immediately under continued agitation of 1400 r.p.m. and the resulting granules are recovered.

The granules are free-flowing, have a bulk density of 13.2 lbs./ft.³, and a 98% of the granules have diameters within the range from 0.250–0.841 mm. For comparison purposes, the starting polypropylene powder is poor flowing, has a bulk density of 18.7 lbs./ft.³ and 81% of the particles of the powder have diameters within the range from 0.125–0.250 mm.

EXAMPLE 12

Following the procedure of Example 1 polystyrene powder particles are slurried in water and heated to the Vicat softening point of the polymer. The resulting granules have average diameters which are noticeably larger than that of the starting particles.

Several runs are carried out according to the procedure of Example 1 except that non-aqueous dispersing media such as ethylene glycol and diethanol amine are employed. The resulting granules are free flowing and are increased in size.

What is claimed is:
1. A process for preparing free-flowing sintered granules of a normally solid, water-insoluble, thermoplastic organic polymer comprising the steps of (1) dispersing a powder of the polymer in a non-solvent liquid dispersing medium in proportions such that a stirrable slurry results; (2) heating the resulting dispersion to a temperature ranging from about 1° below the Vicat softening point of the polymer to about 8° C. above the Vicat softening point while agitating the dispersion at a rate only sufficient to prevent agglomeration of the polymer into a single mass; and (3) cooling the dispersion until the surfaces of the heat softened polymer harden while continuing said agitation, the resulting granules having greater size than the particles of the powder.

2. The process according to claim 1 wherein the polymer is polyethylene.

3. The process according to claim 1 wherein the polymer is an ethylene/butene-1 copolymer.

4. The process according to claim 1 wherein the polymer is polypropylene.

5. The process according to claim 1 wherein the medium is water.

6. The process according to claim 1 wherein the medium is an aqueous liquid containing a surfactant.

7. The process according to claim 6 wherein the surfactant is sodium lauryl sulfate.

8. A process according to claim 1 for preparing free-flowing sintered granules of normally solid, water-insoluble thermoplastic organic polymer selected from the group consisting of the homopolymers and copolymers of the following monomers: α-olefins, monovinylidene aromatic compounds, alkyl acrylates and derivatives thereof, and vinyl acetate, comprising the steps of (1) dispersing a powder of the polymer in water in proportions such that a stirrable slurry results; (2) heating the resulting dispersion to a temperature ranging from about 1° below the Vicat softening point of the polymer to about 8° C. above the Vicat softening point of the polymer while agitating the dispersion at a rate only sufficient to prevent agglomeration of the resulting heat softened polymer into a single mass; and (3) cooling the dispersion until the heat softened surfaces of the polymer harden while continuing said agitation, the resulting granules having greater size than the particles of powder.

9. A process according to claim 1 for preparing free-flowing sintered granules of normally solid, water-insoluble α-olefin polymer comprising the steps of (1) dispersing a powder of the polymer in water in proportions such that a stirrable slurry results; (2) heating the resulting dispersion to a temperature ranging from about 1° C. below the Vicat softening point of the polymer to about 8° C. above the Vicat softening point of the polymer while agitating the dispersion at a rate only sufficient to prevent agglomeration of the resulting heat softened polymer into a single mass; and (3) cooling the dispersion until the heat softened surfaces of the polymer harden while continuing said agitation, the resulting granules having greater size than the particles of powder.

10. A process according to claim 1 for preparing free-flowing sintered granules of normally solid, water-insoluble α-olefin polymers selected from the group consisting of polyethylene, ethylene/butene-1 copolymers, and polypropylene comprising the steps of (1) dispersing a powder of the polymer in water in proportions such that the water-to-polymer ratio is in the range of about 1:2 to about 30:1 by weight; (2) heating the resulting dispersion to a temperature ranging from about 1° C. below the Vicat softening point of the polymer to about 8° C. above the Vicat softening point of the polymer while agitating the dispersion at a rate only sufficient to prevent agglomeration of the resulting heat softened polymer into a single mass; and (3) cooling the dispersion until the heat softened surfaces of the polymer harden while continuing said agitation, the resulting granules having greater size than the particles of powder.

References Cited
UNITED STATES PATENTS

| | | | |
|---|---|---|---|
| 3,101,329 | 8/1963 | Sweeney | 260—94.9 |
| 3,378,507 | 4/1968 | Sargent et al. | 260—2.5 |
| 3,422,049 | 1/1969 | McClain | 260—94.9X |
| 3,432,483 | 3/1969 | Peoples et al. | 260—87.3 |

JOSEPH L. SCHOFER, Primary Examiner

W. F. HAMROCK, Assistant Examiner

U.S. Cl. X.R.

260—86.1, 86.7, 88.7, 89.1, 89.5, 93.5, 93.7, 94.9